US 6,681,190 B2

(12) United States Patent  
Ulrich

(10) Patent No.: US 6,681,190 B2  
(45) Date of Patent: Jan. 20, 2004

(54) METHOD AND SYSTEM OF HARMONIC REGULATION

(75) Inventor: James A. Ulrich, Hartland, WI (US)

(73) Assignee: DRS Power & Control Technologies, Inc., Milwaukee, WI (US)

(*) Notice: Subject to any disclaimer, the term of this patent is extended or adjusted under 35 U.S.C. 154(b) by 0 days.

(21) Appl. No.: 10/464,321

(22) Filed: Jun. 18, 2003

(65) Prior Publication Data

US 2003/0212516 A1 Nov. 13, 2003

Related U.S. Application Data

(62) Division of application No. 09/681,156, filed on Feb. 1, 2001, now Pat. No. 6,604,056.

(51) Int. Cl.[7] .................................................. G01R 22/00
(52) U.S. Cl. ........................ 702/60; 324/76.17; 327/39
(58) Field of Search ....................... 702/60, 64, 65–67, 702/69, 75, 76, 106, 189, 190; 324/521, 522, 601, 612, 76.12, 76.17; 84/621, 654, 681; 327/2, 3, 39, 45, 72, 73, 155; 363/39, 40, 44–47

(56) References Cited

U.S. PATENT DOCUMENTS

| | | | |
|---|---|---|---|
| 5,146,186 A | 9/1992 | Vella | 331/16 |
| 5,287,288 A | 2/1994 | Brennan | 364/483 |
| 5,309,353 A | 5/1994 | Schauder et al. | 364/148 |
| 5,319,535 A | 6/1994 | Brennan | 363/40 |
| 5,321,598 A | 6/1994 | Moran | 363/41 |
| 5,345,377 A | 9/1994 | Edwards | 363/71 |
| 5,351,178 A | 9/1994 | Brennan et al. | 363/40 |
| 5,351,180 A | 9/1994 | Brennan et al. | 363/71 |
| 5,351,181 A | 9/1994 | Brennan et al. | 363/71 |
| 5,355,025 A | 10/1994 | Moran et al. | 307/105 |
| 5,359,275 A | 10/1994 | Edwards | 323/207 |
| 5,384,696 A | 1/1995 | Moran et al. | 363/40 |
| 5,774,366 A | 6/1998 | Beckwith | 702/64 |
| 5,789,928 A | 8/1998 | Baker | 324/623 |
| 5,912,829 A | 6/1999 | Maier | 708/404 |
| 6,072,373 A | 6/2000 | Hayafuji et al. | 331/108 R |
| 6,118,680 A | 9/2000 | Wallace et al. | 363/71 |
| 6,320,392 B1 | 11/2001 | Jonsson | 324/623 |
| 6,356,608 B1 | 3/2002 | Atarius | 375/362 |

Primary Examiner—Marc S. Hoff  
Assistant Examiner—Edward Raymond  
(74) Attorney, Agent, or Firm—Norris, McLaughlin & Marcus, PA

(57) ABSTRACT

A system and method of harmonic regulation includes a harmonic regulator configured to cancel or inject harmonics into a power conversion system. A resettable integrator is provided to determine at least one harmonic coefficient of the at least one error signal harmonic. The resettable integrator determines the at least one harmonic coefficient over a single signal period and is then reset. The harmonic regulator further includes at least one adder to determine a difference of the harmonic coefficient and the reference harmonic coefficient and a regulator is provided to determine an at least one axis harmonic reference signal. The harmonic regulator outputs a three-phase final electrical reference signal that is input into a DC/AC inverter of a power conversion system.

8 Claims, 4 Drawing Sheets

METHOD AND SYSTEM OF HARMONIC REGULATION

The present application is a divisional application of U.S. patent application Ser. No. 09/681,156 filed Feb. 1, 2001, now U.S. Pat. No. 6,604,056, the disclosure of which is incorporated herein by reference.

BACKGROUND OF THE INVENTION

The present invention relates generally to harmonic regulation of a power conversion system and, more specifically, to a method and system of canceling and injecting harmonics into a power conversion signal.

Active filters employing active-feedback loops are increasingly being used to eliminate selected harmonic errors within a power signal of a power conversion or power line conditioner system. Utilizing a feedback loop and an inverter, such active filters are able to minimize the differences between an instantaneous signal and a desired signal. The differences between the instantaneous signal and the desired signal are indicative of the distortion found or created in the signal caused by various loads in the electrical network. Oftentimes, the loads are nonlinear in nature which further accentuates the distortion in the instantaneous signal.

Generally, nonlinear loads cause reflected harmonics to flow back into a power source resulting in typically unwanted harmonics in the electrical network. The active filter is used to reduce these unwanted harmonics using series and/or parallel power conversion stages. Known active filters reduce or cancel the harmonic effects in the power conversion signal by implementing a harmonic regulator that applies a Clarke-Park transformation techniques to convert desired feedback signals to a reference frame synchronous with the harmonic of interest. In these known active filters, the transformed feedback signal containing the unwanted harmonics may contain AC components of other harmonics (including the fundamental) thereby requiring a low pass filter to remove unwanted frequencies in the signal. Further, these known active filters do not permit the displaying of the 1 harmonic magnitudes determined by the Clarke-Park transformation without low pass filtering to eliminate AC components from the transformed signal. Additionally, known filtering systems do not allow for arbitrary references to control any desired harmonic to a zero or non-zero value thereby permitting the driving of the harmonics in the feedback signal to a non-zero value.

It would therefore be desirable to have a system and method capable of canceling and/or injecting harmonics into a power conversion signal. It would further be desirable to design a system and method capable of displaying the magnitudes of harmonic coefficients determined by a discrete Fourier transformation and to complete the discrete Fourier transformation using a resettable integrator over a single signal period without low pass filtering.

SUMMARY OF THE INVENTION

The present invention discloses a method and system of harmonic regulation that overcomes the aforementioned drawbacks. In one aspect of the present invention, a method of harmonic regulation for generating a multiphase electrical reference signal is disclosed. The method includes the step of determining at least one reference harmonic coefficient and identifying an energizing signal having a plurality of harmonics. The method further includes the step of selecting at least one harmonic of the energizing electrical signal and determining at least one harmonic coefficient of the at least one harmonic of the energizing electrical signal over one signal period. The method further includes the step of generating the multiphase electrical reference signal from the previously determined at least one harmonic coefficient.

In accordance with another aspect of the present invention, a method of harmonic regulation for a power conversion system is disclosed. The method includes the steps of determining at least one reference harmonic coefficient and receiving at least one reference input electrical signal and at least one feedback electrical signal. An electrical error signal is then determined from the at least one reference input electrical signal and the at least one feedback electrical signal. Next, the method selects at least one harmonic having at least one coefficient from the electrical error signal and determining an electrical angle, Be. The method then determines a sine signal and a cosine signal of the selected at least one harmonic at the known inverter electrical angle and integrates the sine signal and the cosine signal over one signal time period, T. The signal time period T is equivalent to the reciprocal of the inverter base frequency. The integrated sine signal and the integrated cosine signal are then compared to the at least one reference harmonic coefficient and at least one harmonic axis value is determined therefrom. The method further includes the step of injecting the at least one harmonic axis signal into a power conversion system.

In yet another aspect of the present invention, a harmonic regulator is disclosed. The harmonic regulator includes a feedback signal detector configured to determine a feedback error signal and further configured to determine an electrical angle corresponding to a selected harmonic and further configured to determine a feedback signal period. The harmonic regulator further includes a harmonic selector configured to select a feedback error signal harmonic. A resettable integrator configured to determine at least one harmonic coefficient of the at least one error signal harmonic is further provided wherein the at least one harmonic coefficient is determined over a single feedback signal period. The harmonic regulator further includes at least one adder configured to determine a difference of the at least one harmonic coefficient and the at least one reference harmonic coefficient. A regulator is provided and configured to amplify and integrate the difference and is further configured to determine at least one harmonic axis reference signal. An inverse rotator is provided to receive the at least one harmonic axis reference signal and to generate an inverse rotator output. The harmonic regulator further includes at least one summer configured to determine a final electrical reference signal from the inverse rotator output and an inverter current reference output.

In yet a further aspect of the present invention, a power conversion system is provided. The system includes a number of electromagnetic interference (EMI) filters, an AC/DC converter, a DC link filter, a DC/AC inverter, an AC filter, a plurality of feedback sensors including a plurality of voltage feedback sensors and 4 current feedback sensors, and a feedback loop that includes a number of voltage and current feedback sensor conditioners. The power conversion system further includes an inverter control having a harmonic regulator including a resettable integrator wherein the harmonic regulator is configured to determine at least one reference harmonic coefficient and identify a distortion signal having a plurality of harmonics. The harmonic regulator of the power conversion system is further configured to select at least one harmonic of the distortion signal and determine at least one harmonic coefficient therefrom over a single signal period. The harmonic regulator is further configured to generate a multiphase electrical reference signal for the power conversion system.

In an another aspect of the present invention, a computer program comprising a set of instructions to cause one or more computers to inject at least one harmonic axis signal into a power conversion system. The computer program further causes the one or more computers to determine at least one reference harmonic coefficient and further causes the one or more computers to receive at least one reference electrical signal and at least one instantaneous electrical signal. The set of instructions of the computer program further causes the one or more computers to determine an electrical error signal from the at least one reference electrical signal and the at least one instantaneous electrical signal. The computer program further cause the one or more computers to select at least one harmonic having at least one coefficient from the electrical error signal and to apply a discrete Fourier transformation to the at least one harmonic selected to determine a first integrated signal and a second integrated signal. The one or more computers are then caused to compare the first integrated signal and the second integrated signal to the at least one reference harmonic coefficient and to determine at least one harmonic axis signal therefrom. The computer program then causes the one or more computers to inject the at least one harmonic axis signal into the power conversion system.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
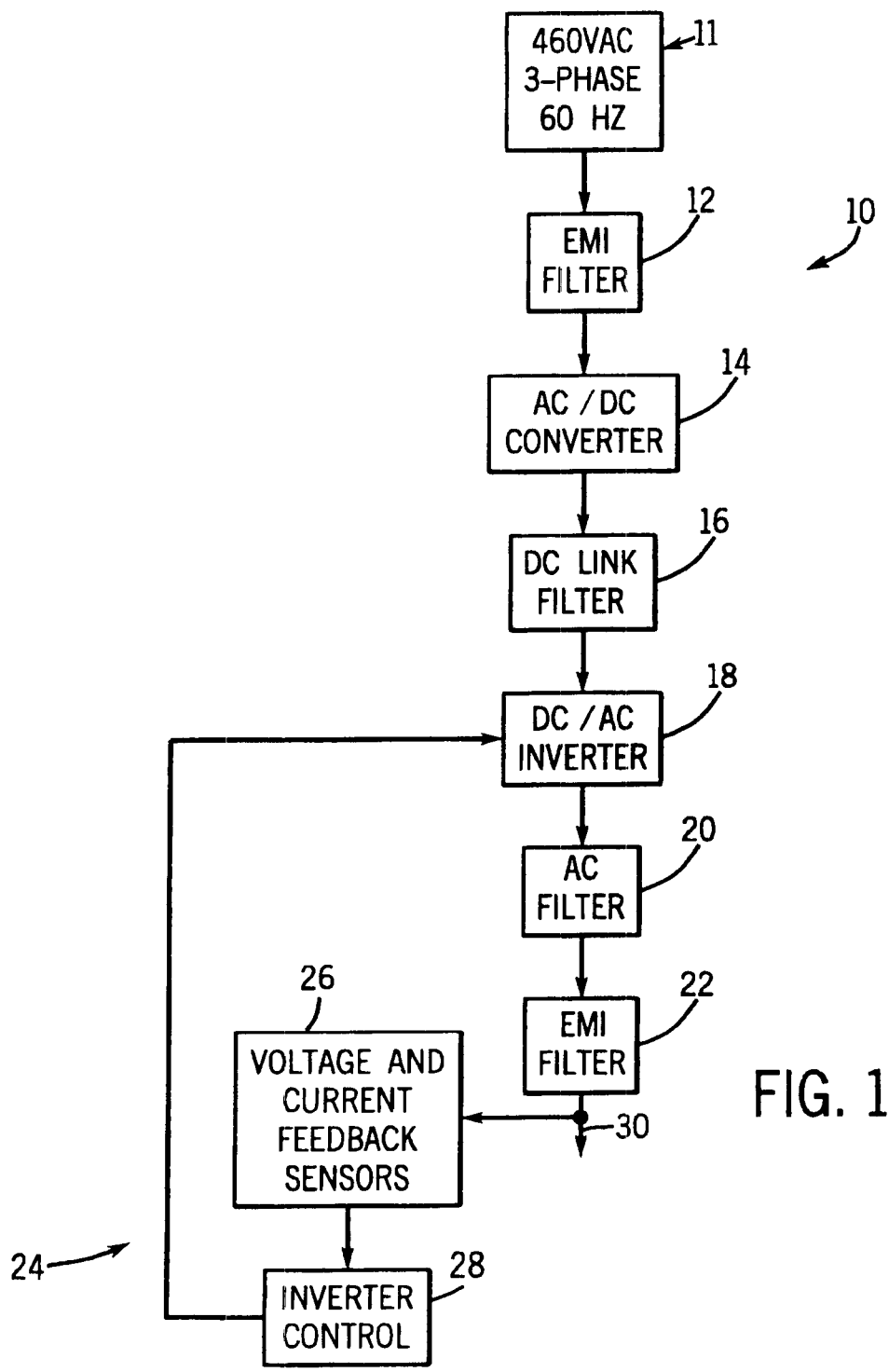
FIG. 1 is a schematic block diagram of a power conversion system in accordance with the present invention.

Referring to FIG. 1, a power conversion system 10 is disclosed. The system 10 includes an electromagnetic interference filter 12 that receives, in a preferred embodiment, a three-phase input 11 of 460 VAC at 60 Hz. The EMI filter 12 reduces or filters out any interference in the input signal 11. After filtering, the input signal 11 is input into an AC/DC converter 14. Implementing a known method, the AC input signal is converted to a DC signal and is input into a DC link filter 16. The DC link filter 16 blocks out any unwanted AC components in the converted signal using, in a preferred embodiment, at least one capacitor (not shown). A DC/AC inverter 18 receives the filtered output from the DC link filter 16. In a preferred embodiment the DC/AC inverter 18 includes a number of Insulated Gate Bi-Polar Transistors (IGBT). IBGT's have superior on-state characteristics, reasonable switching speed, and excellent safe operating area, therefore, in a preferred embodiment, are used to invert the signal. Output from the DC/AC inverter 18 is then fed to an AC filter 20 that removes or filters out any unwanted portions of the inverted signal. Output from AC filter 20 is then fed to another electromagnetic interference filter 22 for removing or reducing any electromagnetic interference remaining in the signal. The power conversion system 10 further includes a feedback loop 24 that includes a plurality of voltage and current feedback sensors 26 and an inverter control system 28, that will be discussed in greater detail with reference to FIG. 2. Ultimately, an output signal 30 is generated generally characterized as a three-phase variable voltage, variable frequency output signal that is fed to a three-phase load (not shown).

Figure 2:
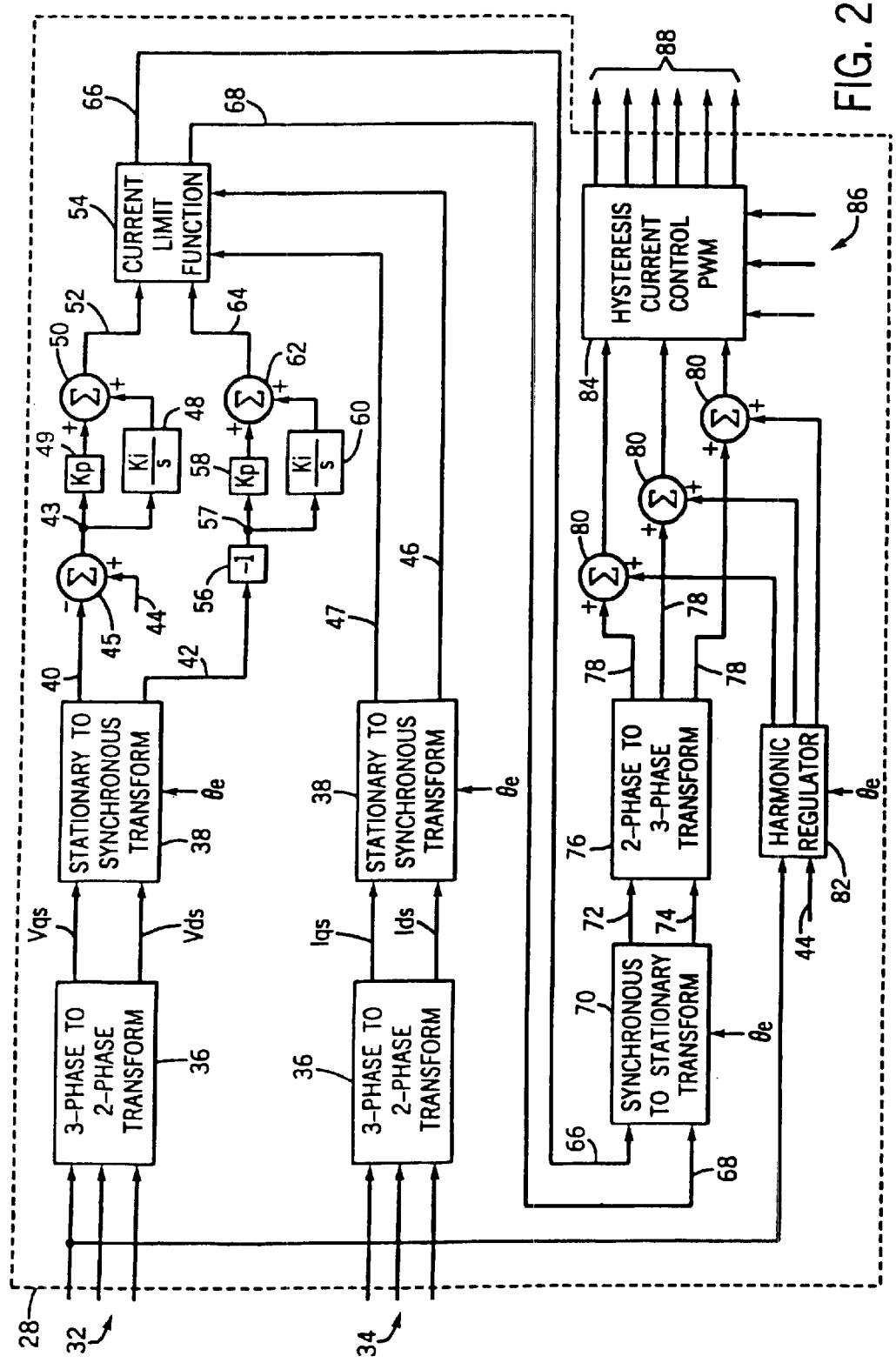
FIG. 2 is a schematic block diagram of the inverter control shown in FIG. 1.

A schematic diagram of the inverter control 28 is shown in detail in FIG. 2. The voltage and current feedback sensors 26 of FIG. 1 detect a three-phase voltage signal 32, FIG. 2, and a three-phase current signal 34. A three-phase to two-phase transformation controller 36 performs a forward Clarke transform on the rotating three-phase voltage signal 32 and the three-phase current signal 34. The two-phase voltage fundamental components, $V_{qs}$ and $V_{ds}$, and the two-phase current fundamental components, $I_{qs}$ and $I_{ds}$, are input into a stationary to synchronous transformation controller 38. Implementing a well known transformation method often referred to as a reverse Park transform, a synchronous quadrature voltage component 40, a synchronous direct voltage component 42, a synchronous quadrature current component 47, and a synchronous direct current component 46 are generated. A difference junction 45, such as an adder, receives the voltage component 40 and compares the voltage component 40 to a reference synchronous quadrature voltage component 44. A Proportional Integral (PI) regulator consisting of gain block 49 and integrator 48 receives the difference junction output 43 and each of the gain block 46 and integrator 48 of the PI regulator generates an output signal that is fed to summing junction 50, such as an adder, that sums the outputs of the PI regulator consisting of gain block 49 and integrator 48. A summing junction output signal 52 is fed to a current limit function controller 54.

Referring to voltage component 42, an amplifier 56 receives voltage component 42 and, in a preferred embodiment, amplifies the voltage component 42 by−1 to regulate the d-axis voltage to zero. The gain block 56 generates an output signal 57 that is an input to a PI regulator comprising gain block 58 and integrator 60 which generates output signals that are summed by an adder 62. The current limit function controller 54 receives summer output signal 64 as well as synchronous quadrature current component 47 and synchronous direct current component 46. Using current reference signals 52 and 64 and current feedback signals 47 and 46, the current limit function controller 54 generates a synchronous quadrature reference current signal 66 and a synchronous direct reference current signal 68 which are received as inputs by a synchronous to stationary transformation controller 70, often referred to as a reverse Park transform.

Still referring to FIG. 2, using the electrical angle, $\theta_e$, the synchronous stationary transformation controller or reverse Park transform 70 determines a stationary quadrature reference current signal 72 and a stationary direct reference current signal 74 that are input to a two-phase to three-phase transformation controller 76, often referred to as a reverse Clarke transform. Controller 76 outputs a threephase rotating reference current signal 78 wherein each reference phase is added to a complementary phase signal by an adder or summer 80. A harmonic regulator 82 generates the three-phase complementary current signal using a single phase voltage input, the synchronous quadrature reference voltage signal 44, and the electrical angle, $\theta_e$. The harmonic regulator 82 will be discussed with greater detail with particular reference to FIG. 3. A hysteresis current control 84 receives the output signals from the summers 80 and further receives inverter pole current feedback signals 86 and outputs a plurality of IGBT gate drive signals 88 which are received by the DC/AC inverter 18 of FIG. 1.

Figure 3:
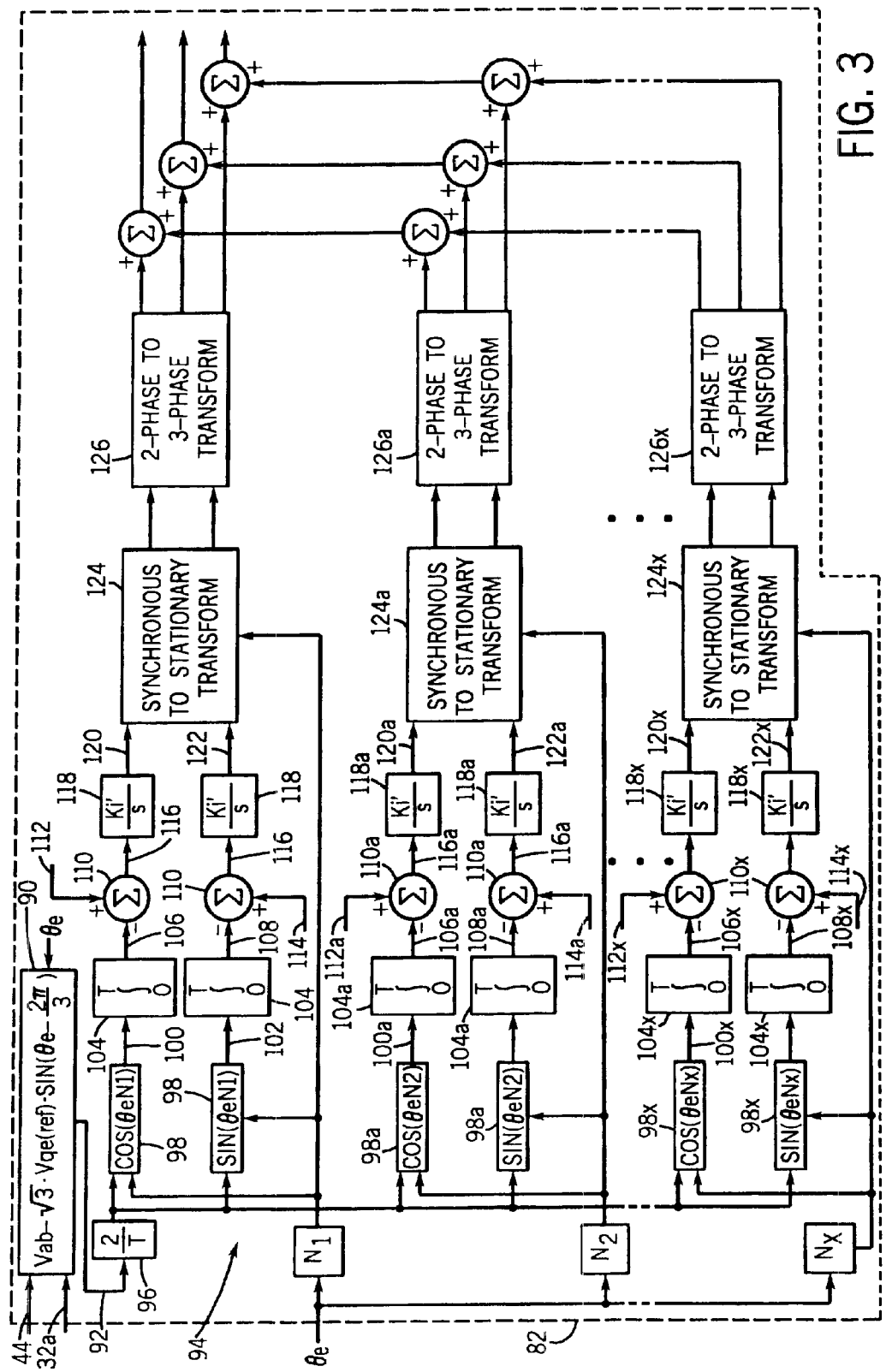
FIG. 3 is a schematic block diagram of the harmonic regulator in accordance with the present invention shown in FIG. 2.

Referring to FIG. 3, a schematic diagram of the harmonic regulator 82 is shown in accordance with the present invention. The harmonic regulator 82 includes a feedback signal detector 90 that receives the synchronous quadrature reference voltage signal 44, one phase of the voltage signal 32a, and the electrical angle, $\theta_e$, corresponding to a particular signal frequency and determines a feedback error signal 10 indicative of the distortion in the input signals 44 and 32a. In one embodiment, the feedback signal detector determines the error signal using the following equation:

$$Vab - \sqrt{3} \cdot Vqe(ref) \cdot \sin(\theta e - 2\pi/3) \qquad \text{Eqn. 1}$$

One of ordinary skill in the art will appreciate however, that alternative functions may be used to calculate the distortion of the input signals 44 and 32a. The feedback error signal 92 then undergoes a discrete Fourier transformation 94.

The distortion signal 92 after being modified by a scaler value 96 is received by at least one signal controller 98. The signal controller 98 using the electrical angle, Be, at the harmonic selected by the harmonic selector (not shown) determines a signal indicative of the cosine 100 of the distortion signal 92 and a signal indicative of the sine 102 of the distortion signal 92. A resettable integrator 104 receives signals 100 and 102, and integrates the signals 100, 102 over a single signal period T. It should be noted, however, that the electrical angle, $\theta_e$, is inverted to a value of $-\theta_e$ for any 6n-1 harmonic, where n equals any positive real integer.

Still referring to FIG. 3, since the output signals of the integrator are determined over a single period, the presence of any AC components in the signal are eliminated yielding a pure DC value equal to the d and q-axis components of the specified harmonic which allows for displaying of the integrator output signals 106, 108 visually to a user, such as with a computer monitor (not shown). A difference junction 110 receives the integrator output signals 106, 108 and compares each to a reference harmonic coefficient 112, 114. The reference harmonic coefficients 112 and 114 are assigned arbitrary values depending upon the goal of the harmonic regulator. For example, to cancel a harmonic of the power conversion signal each reference harmonic coefficient is set to an initial value of zero. Conversely, however, 11 to inject harmonics into a power conversion system reference harmonic coefficients 112 and 114 are initialized to some real value. The harmonic regulator 82 will then generate a signal indicative of the harmonic reference coefficient as initialized.

Adders 110 output a harmonic error signal 116 which is received by integrators 118. Integrators 118 integrate the harmonic error signals 116 with a gain of K, wherein K is an arbitrary value selected depending upon the particular use or function of the harmonic regulator 82. Integrators 118 integrate the harmonic error 116 until harmonic error signal 116 is driven to zero. In a preferred embodiment, signals 120 and 122 are current signals. The synchronous to stationary transformation (reverse Park transform) controller 124 receives signals 120 and 122 as well as the electrical angle, $\theta_e$, corresponding to the harmonic selected by the harmonic selector. The synchronous to stationary transformation 124 determines stationary reference frame signals for the d-axis and q-axis harmonic reference signals using the well known reverse Park transformation technique. The stationary harmonic reference current signals are received by a two-phase to three-phase transformation controller or reverse Clarke transformation controller 126 which determines the three-phase complementary current signals which are summed with reference current signals 78 as was discussed in reference to FIG. 2.

The harmonic regulator 82, as shown in FIG. 3, contemplates harmonic regulation, i.e., cancellation or injection, of a myriad of distortion signal harmonics. Therefore, to simultaneously inject or cancel a number of harmonics of a signal, the present invention contemplates a redundancy of the harmonic regulator components discussed in the paragraphs above. The redundancy of components is shown in FIG. 3 with a second set of components having like numbers as those discussed above, but including an "a" in referencing. A third set of components is likewise shown using an "x" reference with like reference numerals. The function of each is similar to that previously discussed.

Accordingly, the present invention discloses a method of harmonic regulation. The method includes the steps of determining at least one reference harmonic coefficient that will be set to an initial value of zero to cancel harmonics of an energizing electrical signal or to any non-zero value to inject harmonics into an energizing electrical signal of a power conversion system. The method further includes the step of selecting at least one harmonic of the energizing electrical signal and determining at least one harmonic coefficient of the at least one harmonic of the energizing electrical signal over one signal period using a discrete Fourier transformation. The step of performing a discrete Fourier transformation further includes determining a signal indicative of the sine of the energizing electrical signal and a signal indicative of the cosine of the energizing electrical signal. Both the sine and cosine signals are determined using the electrical angle corresponding to the selected harmonic of the energizing electrical signal. The method further includes the step of integrating the cosine and sine signals over one signal period using a resettable integrator. The integration of the cosine signal results in an "a" harmonic and the integration of the sine signal results in a "b" harmonic signal. Next, the "a" and "b" harmonic coefficients are subtracted from an "a" reference harmonic coefficient and a "b" reference harmonic coefficient to produce two error signals. The error signals are then integrated. Following the integration step, the reference signals undergo a reverse Clarke and Park transformation to generate a three-phase harmonic reference signal. The three-phase harmonic reference signal is then added to additional three-phase harmonic reference signals for each remaining harmonic thereby forming a final complementary reference current signal.

To implement the aforementioned method, the present invention further includes a computer program comprising a set of instructions for one or more computers to cause the one or more computers to cancel or inject harmonics into a power conversion system signal. The set of instructions further cause the one or more computers to determine at least one reference harmonic coefficient and receive at least one reference electrical signal and at least one instantaneous electrical signal. The set of instructions further cause the one or more computers to determine an electrical error signal from the at least one reference electrical signal and the at least one instantaneous electrical signal. The electrical error signal is indicative of distortion in the power conversion system. The set of instructions further cause the one or more computers to select at least one harmonic having at least one coefficient and in a preferred embodiment an "a" coefficient and a "b" coefficient from the electrical error signal. The set of instructions further cause the one or more computers to apply a discrete Fourier transformation to the at least one harmonic to determine a first integrated and a second integrated signal.

In a preferred embodiment the first integrated signal is indicative of the sine of the electrical error signal and the second integrated signal is indicative of the cosine of the electrical error signal. To determine the sine and cosine of the electrical error signal, the one or more computers determine an electrical angle, $\theta_e$, for a selected harmonic and implement that angle during the discrete Fourier transformation. In a preferred embodiment the magnitude of the first integrated and the second integrated signals are visually displayed on a monitor or other visual means to a user or technician. Moreover, the first integrated signal and the second integrated signal are determined over a single signal period, T. Therefore, low pass filtering of the integrated signals is unnecessary.

After applying the discrete Fourier transformation, the set of instructions further cause the one or more computers to compare the first integrated signal and the second integrated signal to at least one reference harmonic coefficient. The at least one reference harmonic coefficient may have any arbitrary value depending upon the intended goal of the harmonic regulator. For example, to cancel the selected harmonic of a power conversion signal the at least one reference harmonic coefficient for both the "a" reference harmonic coefficient and the "b" reference harmonic coefficient should be initialized to zero. Conversely, to inject the selected harmonic into the power conversion signal having an x value, the at least one reference harmonic coefficients are initialized with that x value. Next, the set of instructions cause the one or more computers, in a preferred embodiment, to subtract the first integrated signal from the at least one reference harmonic coefficient and subtract the second integrated signal from the at least one reference harmonic coefficient. Resulting therefrom is an adjustment signal that is integrated with a gain of K to determine a direct synchronous harmonic reference signal and a quadrature synchronous harmonic reference signal.

The set of instructions then cause the one or more computers to perform a synchronous to stationary transformation on the direct synchronous harmonic reference signal and the quadrature synchronous harmonic reference signal. This transformation is well known and generally referred to as a forward Park transformation. After the d-axis stationary harmonic reference signal and the q-axis stationary harmonic reference signal are determined, the set of instructions further cause the one or more computers to perform a two-phase to three-phase transformation. This transformation is well known and generally referred to as a reverse Clarke transformation. The three-phase output of the reverse Clarke transformation is then added to any additional three-phase harmonic signals for other selected harmonics to generate a final three-phase complementary reference signal.

Figure 4A:
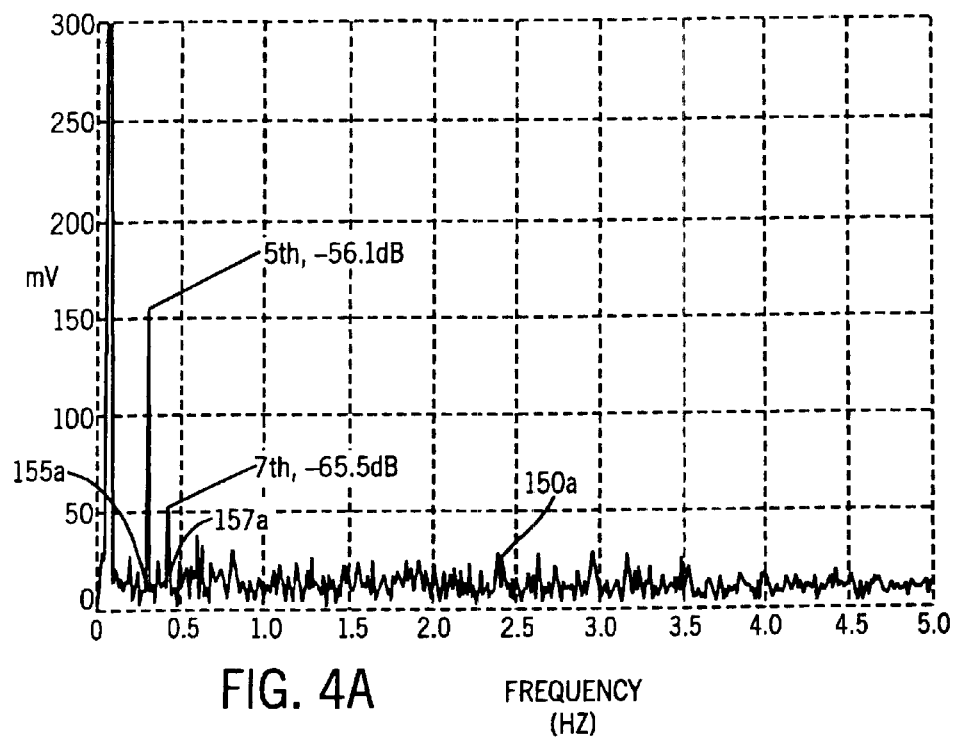
FIG. 4A is a graph illustrating a simulated inverter output voltage spectrum without harmonic regulation.
Figure 4B:
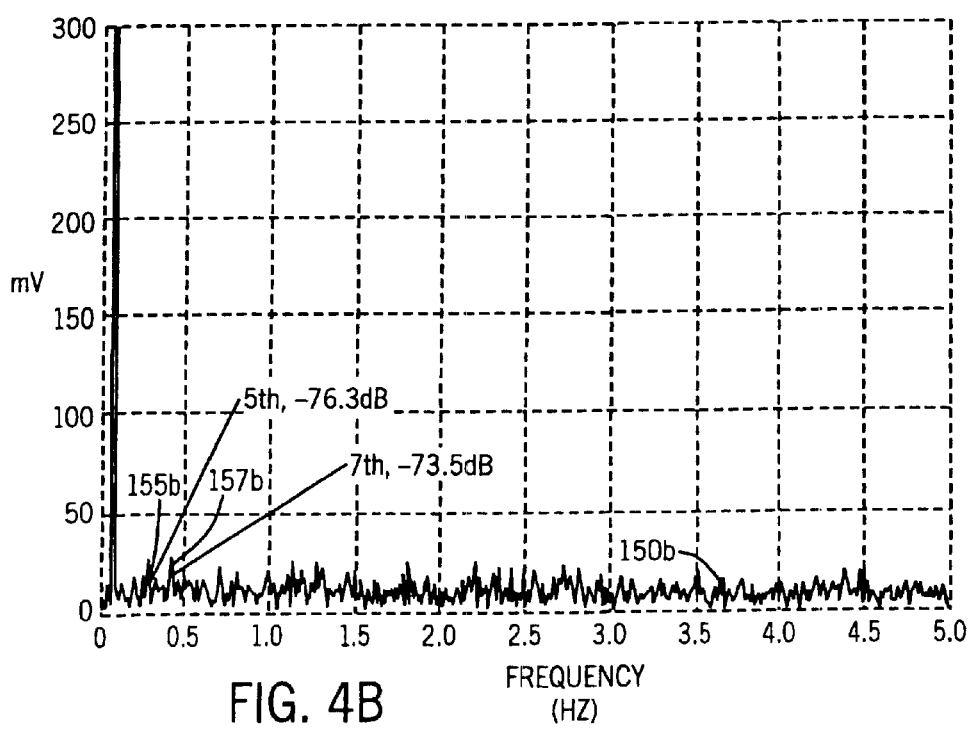
FIG. 4B is a graph in accordance with the present invention illustrating a simulated inverter output spectrum with harmonic regulation.

The method of harmonic regulation as well as the acts accomplished by the one or more computers when instructed by the set of instructions regulate the harmonics of an error signal indicative of distortion in the energizing electrical signal over a single signal period, T. The method/set of instructions repeat continuously in a loop until the coefficients of the selected harmonic of the distortion or error signal match the "a" and "b" reference coefficients. Referring now to FIGS. 4A and 4B, a specific example based on computer simulation will be discussed. To cancel the fifth and seventh harmonics of an energizing electrical signal the harmonic reference coefficients are initialized to a value of zero. To drive the fifth and seventh harmonics of the distortion signal to zero, however, may require several loops of the energizing electrical signal through the harmonic regulator. The number of loops depends upon the initial value of the harmonic coefficients of the distortion of the energizing electrical signal. An initial energizing electrical signal 150a with the fifth and seventh harmonics present 155a, 157a is shown in FIG. 4A. FIG. 4B, however, illustrates the signal 150b of FIG. 4A with the fifth and seventh harmonics 155b, 157b cancelled in accordance with the present invention. Conversely, the present invention contemplates the injection of harmonics into a signal wherein the signal 150b, FIG. 4B is the initial signal and signal 150A, FIG. 4A, with the fifth and seventh harmonics 155a, 157a present is the final signal generated by the harmonic regulator in accordance with the present invention.

The present invention has been described in terms of the preferred embodiment, and it is recognized that equivalents, alternatives, and modifications, aside from those expressly stated, are possible and within the scope of the appending claims.

What is claimed is:

1. A power conversion system, comprising:

first EMI filter coupled to an AC/DC converter;

a DC link filter coupled to the AC/DC converter and a DC/AC Inverter;

an AC filter coupled to the DC/AC and a second EMI filter;

a feedback loop coupled to the second EMI filter and the DC/AC inverter, wherein the feedback loop includes number of voltage feedback sensors and current feedback sensors and an inverter control including an harmonic regulator having a resettable integrator, wherein the harmonic regulator is configured to:
   determine at least one reference harmonic coefficient; identify a distortion signal having a plurality of harmonics; select at least one harmonic of the distortion signal; determine at least one harmonic coefficient of the at least one harmonic of the distortion signal over one signal period; and generate a multiphase electrical reference signal.

2. The power conversion system of claim 1 wherein the resettable integrator is reset to an initial value after the at least one reference harmonic is determined.

3. The power conversion system of claim 1 wherein the harmonic regulator is further configured to determine an error factor, wherein the error factor includes a difference of the at least one reference harmonic coefficient and the at least one harmonic coefficient.

4. The power conversion system of claim 1 wherein the harmonic regulator is further configured to multiply an amplification factor to the error factor and determine at least one axis harmonic reference value therefrom.

5. The power conversion system of claim 4 wherein the harmonic regulator is further configured to determine the at least one axis harmonic reference value by integrating the product of the error factor and the amplification factor.

6. The power conversion system of claim 5 wherein the harmonic regulator is further configured to inversely rotate the at least one axis harmonic reference at the electrical angle, $\theta_e$, to determine the multiphase electrical reference signal.

7. The power conversion system of claim 1 wherein the harmonic regulator is further configured to generate the multiphase electrical reference signal without low pass filtering.

8. The power conversion system of claim 1 wherein the harmonic regulator is further configured to display the at least one harmonic coefficient.

\* \* \* \* \*

UNITED STATES PATENT AND TRADEMARK OFFICE
CERTIFICATE OF CORRECTION

PATENT NO.    : 6,681,190 B2
DATED         : January 20, 2004
INVENTOR(S)   : James A. Ulrich It is certified that error appears in the above-identified patent and that said Letters Patent is hereby corrected as shown below:

<u>Column 8,</u>
Line 22, "Inverter" should read -- inverter --.
Lines 26-27, "loop includes number" should read -- loop includes a number --.

Signed and Sealed this

Thirtieth Day of March, 2004

JON W. DUDAS
*Acting Director of the United States Patent and Trademark Office*